Patented Mar. 23, 1937

2,074,858

UNITED STATES PATENT OFFICE 2,074,858

METHOD OF TREATING PHOTOGRAPHS AND THE RESULTING ARTICLE

Alfred C. Raffo, Grantwood, N. J.

No Drawing. Application May 16, 1936, Serial No. 80,142

14 Claims. (Cl. 41—27)

This invention relates to an improved method for treating photographs, and to the resulting article, and is particularly directed to the production of glossy finish colored photographs of exceptionally fine appearance and capable of withstanding exposure to sunlight without fading and of withstanding moisture without running and blurring.

It is to be understood that the present invention is distinct from photographing in colors, being directed to the coloring and finishing of black and white prints.

It is notoriously old to color black and white prints by the application of coloring matter to the surface thereof, but such photographs are unsatisfactory for many reasons, in that when exposed to sunlight the colors soon fade and the colors run and become blurred in handling the photograph or if the photograph becomes wet.

It is an object of my invention to provide a process to be used in the coloring of black and white prints whereby the above mentioned objections are overcome.

In the finished photograph produced by my improved method, the coloring matter apparently lies below the surface of the emulsion, the photograph being treated finally to close the pores of the emulsion and gloss the surface thereof, so that in effect there is a glossy transparent film of the emulsion of the photograph over the colors.

In the practice of my invention the photograph is first developed and fixed in the usual manner, after which I wash the photograph in clear water and then subject to a mordanting bath for from ten to fifteen minutes. This bath comprises aluminum sulphate, sodium carbonate and sodium acetate. In making up this bath I employ approximately eight ounces of aluminum sulphate to thirty-two ounces of water; two ounces of sodium carbonate to twelve ounces of water, and a five percent solution of sodium acetate.

The prints are next dried and are ready for coloring.

In preparation for the coloring step I first dissolve concentrated powdered anilin in hot water, the proportion of anilin and water of course varying with the degree or shade of color desired. I then add aqua ammonia (for example, an aqua ammonia, about 28% ammonia by weight). The ammonia, as will be hereinafter mentioned, is for the purpose of opening the pores of the emulsion when the coloring matter is applied to a photograph. The amount of ammonia added will depend upon the color under consideration. For example, in the case of yellow I employ from 4% to 10% by volume of aqua ammonia; that is to say, to 100 parts by volume of yellow I add 4 to 10 parts by volume of aqua ammonia; in the case of red I employ from 2% to 8% by volume of aqua ammonia; and for blue I employ from 1% to 5% by volume of aqua ammonia.

The color solution is applied to the photograph by hand or in any other convenient manner, the ammonia opening the pores of the emulsion so that the coloring material is carried into the emulsion as distinguished from being merely deposited upon the surface of the same. The ammonia also counteracts to a large extent the natural greasiness common to photographic prints.

After the coloring operation the prints are treated in a bath of acetic acid to fix the colors so as to avoid bleaching or fading and following this treatment are placed in a special hardening bath for the purpose of hardening the emulsion which was softened somewhat by the ammonia solution used in coloring. This hardening bath may comprise, for example, four ounces of sodium sulphite, twelve ounces of twenty-eight percent acetic acid solution and four ounces of alum together with water up to five gallons.

After the hardening bath the prints are placed in a glycerin water bath of a ten percent gravity solution for the purpose of softening the tissues of the paper of the print, this bath also preventing cracking, frilling, etc. of the emulsion as well as the paper.

The photographs are now in condition for the glossing step. In this step of my improved process the prints are placed face down on a highly polished ferrotype composition plate and passed through an air conditioned drying cabinet at a temperature ranging between 90 and 120° F.

The article resulting from this process is a colored photograph in which the colors lie beneath the surface of the emulsion, the pores of the emulsion in the final stage of the process being closed and glossed, so that in effect there is a glossy transparent film of the emulsion of the photograph over the coloring matter.

In the several baths employed in the practice of my process the print remains immersed for at least about ten to fifteen minutes for best results. It will be understood, however, that this period varies somewhat, depending upon the colors, etc. employed. It is to be understood also that the proportions of the materials entering into the several baths, as above set out, may be varied without departing from the spirit and scope of my invention.

What I claim is:

1. The method which comprises subjecting a developed and fixed photograph to a mordanting bath, coloring the photograph with a color solution capable of opening the pores of the emulsion to permit of the entry of the coloring material into the emulsion, and final treating to close the pores of the emulsion and produce a glossy emulsion surface over the coloring material.

2. The method which comprises subjecting a developed and fixed photograph to a mordanting bath of aluminum sulphate, sodium carbonate and sodium acetate, then coloring the photograph, subjecting the same to a hardening bath, and finally ferrotyping to produce a glossy surfaced photograph in which the coloring material lies under the surface of the emulsion of the photograph.

3. The method which comprises washing a developed and fixed photograph, subjecting the washed photograph to a mordanting bath, then coloring the same with coloring material mixed with aqua ammonia, subjecting the photograph to a hardening bath, and finally ferrotyping.

4. The method which comprises subjecting a developed and fixed photograph to a mordanting bath, coloring the same with coloring material mixed with aqua ammonia, subjecting the colored photograph to a hardening bath of sodium sulphite, acetic acid, alum and water, and finally ferrotyping.

5. The method which comprises subjecting a developed and fixed photograph to a mordanting bath of aluminum sulphate, sodium carbonate and sodium acetate, coloring the same with coloring material mixed with aqua ammonia, subjecting the colored photograph to a hardening bath comprising an aqueous solution of sodium sulphite, acetic acid and alum, then subjecting the photograph to a water-glycerin bath, and finally ferrotyping.

6. The method which comprises subjecting a developed and fixed photograph to a mordanting bath comprising aluminum sulphate and water in the proportions of eight ounces of aluminum sulphate to thirty-two ounces of water, sodium carbonate and water in the proportions of two ounces of carbonate to twelve ounces of water, and a five percent solution of sodium acetate, coloring the photograph, subjecting the same to a hardening bath, and finally ferrotyping.

7. The method which comprises subjecting a developed and fixed photograph to a mordanting bath, then coloring the same with coloring material mixed with aqua ammonia, subjecting the photograph to a hardening bath comprising an aqueous solution of approximately four ounces of sodium sulphite, twelve ounces of acetic acid, four ounces of alum to five gallons of water, and finally ferrotyping.

8. The method which comprises subjecting a developed and fixed photograph to a mordanting bath, then coloring the same with coloring material mixed with aqua ammonia, subjecting to a bath of acetic acid, then subjecting the photograph to a hardening bath of an aqueous solution of sodium sulphite, acetic acid and alum, and finally ferrotyping.

9. A colored photograph comprising in combination an emulsion base, coloring matter embedded in the surface thereof, the pores of the emulsion being closed over the coloring matter.

10. A colored photograph having a glossy, transparent emulsion surface, the coloring matter being embedded in the surface pores of said emulsion, the said pores of the emulsion being closed over the coloring matter.

11. A colored photograph comprising in combination a support, emulsion on the surface thereof, coloring material embedded in the pores of the emulsion, the pores at the surface of the emulsion being closed over the coloring material, the said surface of the emulsion being glossy and transparent.

12. The method which comprises coloring a developed and fixed photograph with a color solution capable of opening the pores of the emulsion to permit of the entry of the coloring material into the emulsion, and finally treating to close the pores of the emulsion and produce a glossy emulsion surface over the coloring material.

13. The method which comprises washing a developed and fixed photograph, then coloring the same with coloring material mixed with aqua ammonia, subjecting the photograph to a hardening bath, and finally ferrotyping.

14. The method which comprises subjecting a developed and fixed photograph to a mordanting bath of aluminum sulphate, sodium carbonate and sodium acetate, then coloring the photograph with yellow, red and blue anilin colors, the yellow anilin color being mixed with from four to ten percent by volume of aqua ammonia, the red being mixed with from two to eight percent by volume of aqua ammonia, the blue being mixed with from one to five percent by volume of aqua ammonia, subjecting the photograph to a hardening bath and finally ferrotyping.

ALFRED C. RAFFO.